United States Patent [19]
Schuchman et al.

[11] Patent Number: 5,640,453
[45] Date of Patent: Jun. 17, 1997

[54] UNIVERSAL INTERACTIVE SET-TOP CONTROLLER FOR DOWNLOADING AND PLAYBACK OF INFORMATION AND ENTERTAINMENT SERVICES

[75] Inventors: Leonard Schuchman, Potomac, Md.; Kenneth Cunningham, Sterling; Joseph Smallcomb, Herndon, both of Va.

[73] Assignee: Stanford Telecommunications, Inc., Reston, Va.

[21] Appl. No.: 288,754

[22] Filed: Aug. 11, 1994

[51] Int. Cl.$^6$ .............. H04N 7/167; H04L 9/00
[52] U.S. Cl. .............. 380/10; 380/3; 380/4; 380/5; 380/20; 380/49; 348/6; 348/7; 348/10; 348/12; 455/3.1; 455/4.1; 455/4.2; 455/5.1; 455/6.1; 455/6.2
[58] Field of Search .............. 380/10, 20, 3, 380/4, 5, 49; 348/6, 7, 8, 9, 10, 13, 12; 455/3.1, 4.1, 4.2, 5.1, 6.1, 6.2

[56] References Cited

U.S. PATENT DOCUMENTS

| | | | |
|---|---|---|---|
| 4,028,733 | 6/1977 | Ulicki | 348/7 X |
| 4,450,481 | 5/1984 | Dickinson | 380/10 X |
| 4,590,516 | 5/1986 | Abraham | 348/7 |
| 4,710,955 | 12/1987 | Kauffman | 380/10 |
| 4,755,872 | 7/1988 | Bestler et al. | 348/7 X |
| 5,003,384 | 3/1991 | Durden et al. | 348/7 X |
| 5,133,079 | 7/1992 | Ballantyne et al. | 348/7 X |

*Primary Examiner*—Bernarr E. Gregory
*Attorney, Agent, or Firm*—Jim Zegeer, Esq.

[57] ABSTRACT

A universal interactive control system for the downloading and playback of information and entertainment services from one or more network distribution centers, said one or more network distribution centers providing information and entertainment signals selected from video and audio programs, video catalogs, and data files, said universal interactive control system. The interactive control system includes: a controller circuit, a data distribution circuit controlled by the controller circuit, a data processor circuit controlled by the controller circuit, and a first plurality of interface connector circuits, with a first of the interface connector circuits for connecting the distribution circuit to a display device under control of the controller, and a second of the interface connector circuits for connecting the data distribution circuit to a storage device under control of the controller circuit.

4 Claims, 2 Drawing Sheets

UNIVERSAL INTERACTIVE SET-TOP CONTROLLER FOR DOWNLOADING AND PLAYBACK OF INFORMATION AND ENTERTAINMENT SERVICES

BACKGROUND AND BRIEF DESCRIPTION OF THE INVENTION

The invention relates to a universal interactive set-top controller for the downloading and playback of information and entertainment services from one or more network distribution centers.

The distribution of program materials, via networks, has become a major industry providing movies, sport events, news, home shopping, database services and other programs to the subscriber for a fee. The network distribution system provides these materials on a real-time basis according to a predetermined (usually) published schedule. Technology advances require the network to become an interactive "information highway" permitting not only the distribution of scheduled program materials, but also permitting the subscriber to request materials of his or her choosing and his or her schedule convenience. While it is possible under present systems to order and receive a specific program from the network distribution center for viewing at a subscriber selected time, the limited capacity of the network by necessity limits the number of such programs distributable on demand.

The invention comprises a universal interactive controller (sometimes herein called set-top box controller) for the downloading and playback of information and entertainment services from one or more network distribution centers. Each network distribution center provides information and entertainment services selected from video and audio programs, video catalogs, data files, computer software and the like. The interactive controller or set-top box includes a controller and an interface between the network distribution centers, a data processor for processing the information in entertainment subject matter to and from a storage device via a data distribution circuit. A first plurality of interface connect circuit controlled by the controller sends signals to the network distribution center ordering specific items of information and entertainment via a network interface and, at the same time, controls the storage device controlled interface so as to tell the data distribution circuit whether the information and entertainment is to be viewed real-time and hence distributed directly to a TV set, or a digital interface to a computer, or a audio channel or to a video channel, or whether it is to be stored for later use by the subscriber.

The controller is controlled locally via a further interface for entering set-top control signals from a remote controller such as a hand-held controller, or from a keyboard, or numerical pad. Thus, the interactive set-top controller serves as a hub between the network distribution center and a variety of the subscriber components such as the TV, personal computer, stereo player, or simply a video display. In any case, the local storage device such as a VCR or optical recorder is interfaced to the subscriber's television set by the interactive set-top controller of the present invention.

The invention thus provides an intelligent interactive set-top box controller that provides non-real-time playback of video services (e.g., movies) and uses a generic or standard video cassette recorder as a storage device to recorder or download services during non-peak hours.

The invention also provides full VCR functionality during playback and provides controllability of reordered surfaces through encryption/scrambling to prevent unauthorized use and also to provide a method of billing the subscriber on a "per view" basis.

The invention also provides a way of providing information to entertainment services to a subscriber acting as a hub between various distribution networks, storage devices and subscriber components. In addition, services from the network distribution center may be accessed and processed in real-time or downloaded at a specified time (e.g., non-peak hours) and played back at subscriber convenience.

Services can be delivered via wireless (e.g., broadcast RF) networks, wired (e.g., coaxial cable), fiber optics (twisted pair cable) networks and/or postal services (e.g., diskettes, tapes and laser disks). Information can be controlled by encryption to prevent replay by unauthorized parties that do not have a proper or authorized interactive set-top controller.

Decryption process is performed at the set-top box in the processor and can be controlled directly by network distribution for "per-view" billing.

Thus, the subscriber can receive upon request, encrypted/scrambled transmissions through the subscriber set-top box and recorded on the subscriber's storage device VCR at a time specified by the network distribution center for optimum economic transmission of the data. Alternatively, the subscriber may set their storage device (VCR) for recording a specified downloading time of services (e.g., film). The subscriber may keep the recorded tape for future playing or replaying. When a subscriber plays the recorded information or entertainment service from the network distribution center, the interactive set-top box controller reads the tape identification (ID) header code and decodes the encrypted/scrambled tape and displays it on the subscriber's television (TV) set. In addition, the set-top box controller records the number of times and duration of playback for billing purposes. The operation of the invention does not interfere with the subscriber's full control of the functionality of the VCR or the TV set (e.g., pause, rewind, fast forward, etc.) In addition, the system is expandable in order to be able to accommodate future changes in storage technology where it is contemplated that future storage devices will have interactive capacities with the subscriber's set-top box to command storage devices to record video services and a controlled data stream from the storage device. In other words, in this case, VCR functionality will be done or controlled through the set-top box controller.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
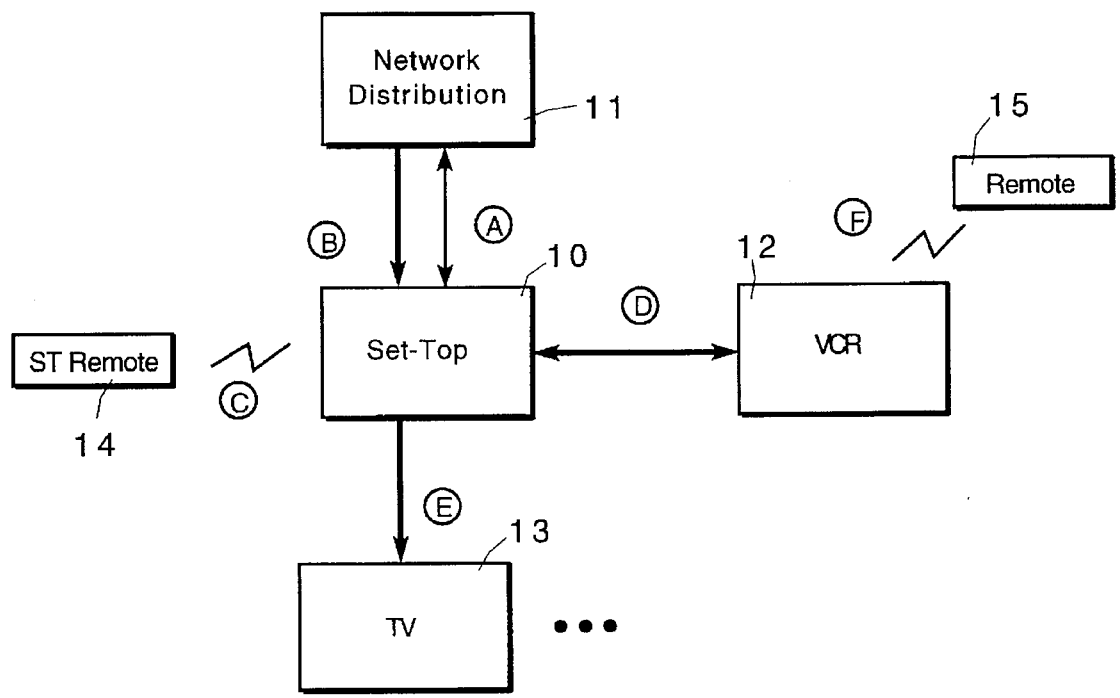
FIG. 1 illustrates the primary configuration in which the VCR (i.e. storage device) is directly controlled by the subscriber.

Interactive set-top controller 10 is the hub between one or more network distribution centers 11 and a variety of subscriber components such as TV 13 and video cassette recorders (VCR) 12. It will be appreciated that there may be one or more televisions 13, and one or more VCRs 12 and the TVs, VCRs, or video cassette recorders can be solid state rather than magnetic such as optical.

The interactive set-top controller 10 may be controlled by a remote controller 14 or a keyboard. VCR 12 may be controlled by its own remote controller 15.

In this primary configuration (FIG. 1), in which the VCR (i.e. the storage device) is directly controlled by the subscriber, the interactive set-top controller box is required only to provide the connection between the network distribution centers 11 and the storage device 12 during downloading operation. During playback process, the interactive set-top controller 10 passively monitors the information stream from the storage device (e.g., the device information stream is in timed-tagged packets) to determine stream flow (e.g. pause, fast forward, reverse, etc.)

In this condition, the subscriber can receive upon the subscriber's request encrypted/scrambled subscriptions through the subscriber's interactive control box 10 and record on the subscriber's VCR recorder 12. Recording can also occur at times specified by the network distribution center 11 or the subscriber may set the VCR 12 for recording at specified downloading times of service (e.g., film).

The subscriber may keep recorded tapes for future playing (or replaying). The subscriber may play recorded tapes in which case the set-top box reads the tape identification or header and decodes the encrypted/scrambled tape and displays same on TV 13.

In the embodiment of FIG. 1, the subscriber has full VCR functionality (e.g., pause, rewind, fast forward, etc.) It is anticipated that other storage devices having interactive capacities with the subscriber set-top box 10 can be used to command storage devices to record video services and control the data stream from the storage device. In other words, the VCR functionality would be controlled through the interactive set-top box controller 10.

Figure 2:
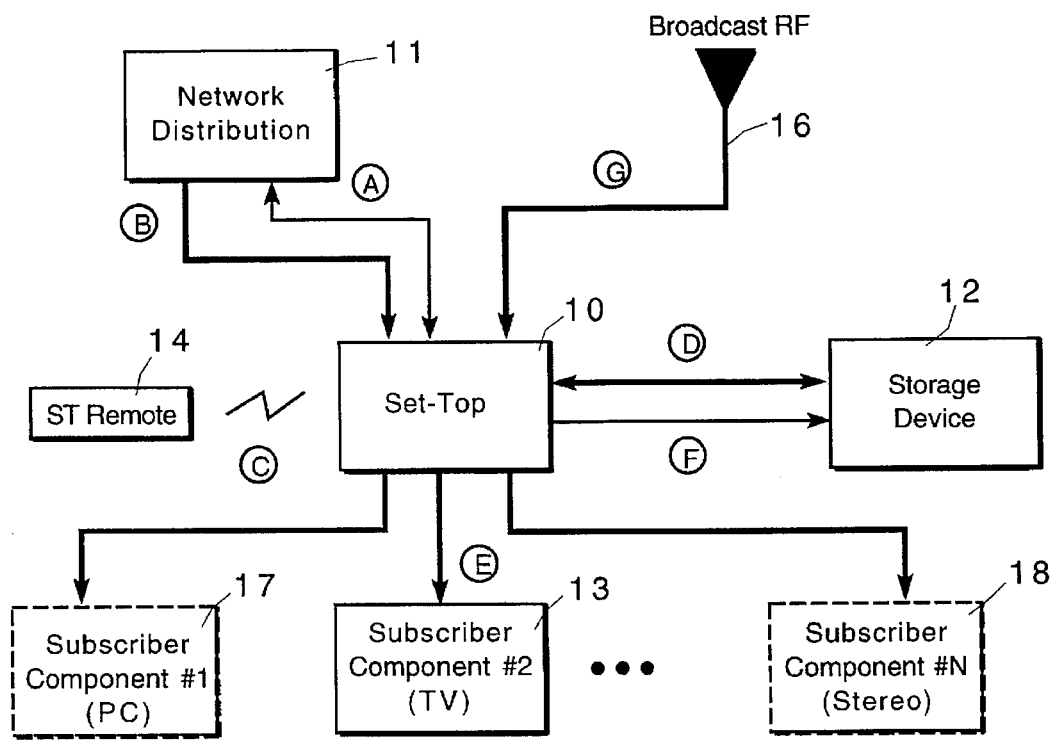
FIG. 2 illustrates a preferred embodiment of the architecture configuration of the interactive controller of the present invention.

In FIGS. 1 and 2, the heavy interconnect lines indicate the flow path for information in the entertainment services and, the light interconnect lines are the pass between the data storage control interfaces.

In FIG. 2, note that the storage device is not controllable by its own remote controller but, rather, is controlled by the remote controller 14'. Note also that a path G is provided for broadcast RF signals from antenna/receiver 16. Note that control path F has been provided to control the storage device and addition to subscriber component such as a personal computer 17 and a subscriber stereo 18 have been shown to demonstrate the versatility of the information and entertainment services providable via the system.

In the embodiment shown in FIGS. 1 and 2, the network distribution center which provides premium services to the subscriber, sends the information (in this context, information includes, but is not limited to video programs, audio programs, video games, video catalogs, and data files). All forms of information can be baseband, compressed, scrambled, or encrypted. The network distribution center processes requests from the subscriber received via request channels A (shown in FIG. 1) which originate from the remote controller 14 or in numerical keypad or keyboard.

All forms of information can be either analog or in digital formats and premium services provided to the subscriber from the network distribution centers 11 via data flow channels B can be either encrypted or scrambled to present unauthorized usages. The storage device 12 provides long-term storage of information received from the network distribution centers 11. It will be appreciated that these storage devices can be either audio cassette players, video cassette recorders and players, digital audio tape players (DAT), laser disks or digital hard disks. In one preferred embodiment, a conventional VCR is utilized and is shown in the primary configuration of the set-top box architecture shown in FIG. 1.

The storage devices store and play back downloaded information and are controllable directly by the subscriber by remote controller 15 in FIG. 1 or by remote controller 14 in FIG. 4.

Figure 3:
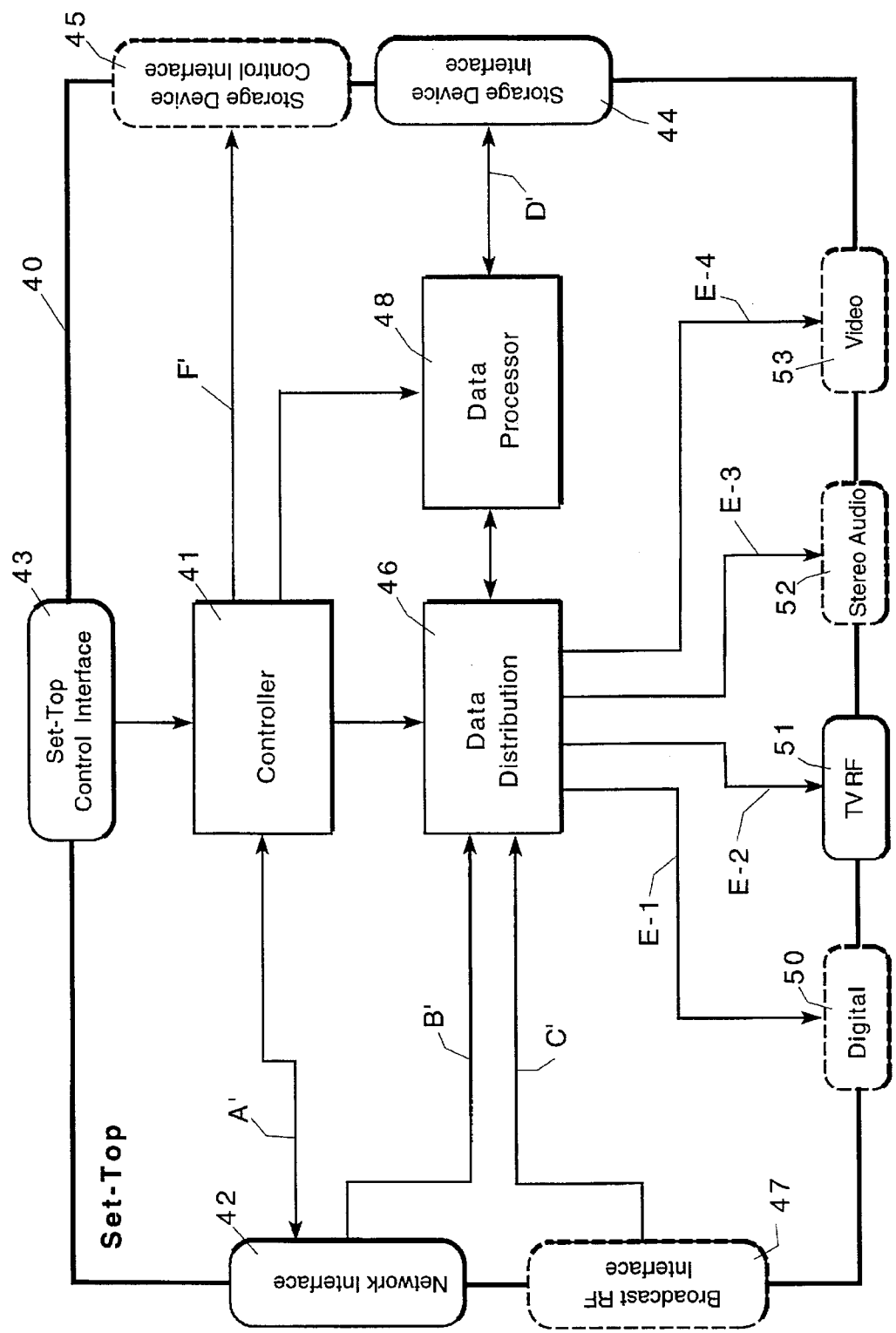
FIG. 3 is a more detailed block diagram of the interactive set-top box controller incorporating the present invention.

Referring now to FIG. 3, interactive controller and set-top box block diagram, a diagrammatic circuitboard 40 carries a controller 41 and a first plurality of interfaces 42 for interfacing with the network distribution center 11 (FIG. 2). A set-top control interface 43 for coupling to the set-top remote controller 14 and storage device interface 44 for interacting with the VCR or other local storage device 12. In the event the local storage device is controlled from the set-top remote controller 14, a control channel F and a storage device control interface 45 is provided.

In FIG. 2, the control channels or paths A and F are correspondingly illustrated in FIG. 3 as A', F'. Information and entertainment signals received from the network distribution center on network interface 42 are conveyed via signal path B' and a data distribution circuit 46 either directly to a user utilization device (subscriber PC 17, subscriber TV 13, subscriber stereo player 18, for example, via channels E1, E2, E3, E4, etc.) or via the data processor 48 on channel D' to the storage data interface 44 and storage device 12 for storage and later playback or for simultaneous storage and real-time display or utilization on the utilization device 13, 17 and 18.

Thus, the interactive controller shown in FIG. 3, performs information distribution to and from the subscriber components in the network distribution center 11 or from a received radio frequency broadcast on antenna 16 via interface 47 and data distribution 46. It also provides standard interfaces for the subscriber to control the subscriber components via channels E1, E2, E3 and E4, respectively. Moreover, the set-top interface, via the controller 41 handles interactions with the network distribution center 11. Such interactions include service requests, acknowledgements, authorization requests, and billing information.

Information and entertainment services transmitted by the network distribution center typically, for billing purposes, are encrypted, and the interface controller set-top unit 10 handles all decryption and/or unscrambling of real-time from the network distribution centers and downloaded information from the storage devices.

The interactive controller 10 also incorporates modem and digital interfaces such as in-channel E1 to the subscriber personal computer 17.

As shown in FIG. 2, the set-top control interface 43 in this embodiment (but not in the embodiment of FIG. 1) provides control of the storage devices 12 via control channel F' and interface 45.

In the embodiment of FIG. 1, it provides passive VCR command interpretation. This is, is a stand-alone storage device configuration.

Finally, the interactive controller set-top box 10 provides standard interfaces, digital 50, TV RF 51, stereo audio 52, and video 53 to various connected subscriber components as indicated in FIG. 2.

While preferred embodiments of the invention have been described and illustrates, it will be appreciated that various other adaptations, modifications and embodiments of the invention will be readily apparent to those skilled in the art.

What is claimed is:

1. An interactive control system for the downloading and playback of information and entertainment services from one or more network distribution centers, said one or more network distribution centers providing information and entertainment signals selected from video and audio programs, video catalogs, and data files, said interactive control system comprising:

a controller circuit, a data distribution circuit controlled by said controller circuit, a data processor circuit controlled by said controller circuit, a plurality of interface connector circuits, a first of said interface connector circuits for connecting said data distribution circuit to a display device under control of said controller, a second of said interface connector circuits for connecting said data distribution circuit to a storage device through said data processor and under control of said controller circuit, and wherein said information and entertainment signals are encrypted and said data processor decrypts said information and entertainment signals stored in said storage device and transmits decrypted information and entertainment signals to said display device through aid data distribution circuit and wherein said encrypted information and entertainment signals incorporate an identification (ID) header and said processor being for recording the number of times and other data concerning playback of the information and entertainment signals by a subscriber and transmitting same to said network distribution center.

2. The interactive control system defined in claim 1 including a second plurality of electrical interface connectors including means for connecting said data distribution circuit to said one or more network distribution centers and means for connecting said data distribution circuit to a source of RF broadcast.

3. An interactive control system for the downloading and playback of information and entertainment services from one or more network distribution centers, said one or more network distribution centers providing information and entertainment signals selected from video and audio programs, video catalogs, and data files, said interactive control system comprising:

a controller circuit;

a data distribution circuit controlled by said controller circuit, a data processor circuit controlled by said controller circuit, a first plurality of interface connector circuits, a first of said interface connector circuits for connecting said distribution circuit to a display device under control of said controller, a second of said interface connector circuits for connecting said data distribution circuit to a storage device under control of said controller circuit, said network distribution center includes means for encrypting and downloading said information and entertainment to storage media suitable for playback on said storage device and physical delivery of said storage media to a user, and wherein said storage device is a standard video cassette recorder.

4. An interactive control system for the downloading and playback of information and entertainment services from one or more network distribution centers, said one or more network distribution centers providing information and entertainment signals selected from video and audio programs, video catalogs, and data files, said interactive control system comprising:

a controller circuit, a data distribution circuit controlled by said controller circuit, a data processor circuit controlled by said controller circuit, a plurality of interface connector circuits, a first of said interface connector circuits for connecting said data distribution circuit to a display device under control of said controller, a second of said interface connector circuits for connecting said data distribution circuit to a storage device through said data processor and under control of said controller circuit, and wherein said information and entertainment signals are encrypted and said data processor decrypts said information and entertainment signals stored in said storage device and transmits decrypted information and entertainment signals to said display device through aid data distribution circuit and wherein said information and entertainment signals are digitized and compressed, and said processor includes means for decompressing and converting aid digital signals to analog for playback.

* * * * *